(12) United States Patent
Kuo et al.

(10) Patent No.: US 8,992,036 B2
(45) Date of Patent: Mar. 31, 2015

(54) DISPLAY DEVICE, BACK PLATE ELEMENT AND SPLICING PARTS OF BACKLIGHT MODULE AND MANUFACTURING MOLD FOR SPLICING PARTS THEREOF

(75) Inventors: Yi-cheng Kuo, Guandong (CN);
Yu-chun Hsiao, Guandong (CN);
Chengwen Que, Guandong (CN);
Pangling Zhang, Guandong (CN);
Dehua Li, Guandong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 315 days.

(21) Appl. No.: 13/641,102

(22) PCT Filed: Aug. 10, 2012

(86) PCT No.: PCT/CN2012/079951
§ 371 (c)(1),
(2), (4) Date: Oct. 13, 2012

(87) PCT Pub. No.: WO2014/023020
PCT Pub. Date: Feb. 13, 2014

(65) Prior Publication Data
US 2014/0043792 A1  Feb. 13, 2014

(51) Int. Cl.
*G09F 13/04* (2006.01)
*G09F 13/08* (2006.01)
*G02F 1/1335* (2006.01)

(52) U.S. Cl.
CPC .............. *G09F 13/04* (2013.01); *G02F 1/1336* (2013.01)

USPC .......... 362/97.1; 362/97.2; 362/632; 362/633

(58) Field of Classification Search
CPC ................... G02F 1/133308; G02F 1/133608; G02F 1/133602; H05K 5/02; H05K 7/00; G09F 13/04; G09F 13/0413; G09F 13/18
USPC ............... 362/97.2, 97.1, 632, 633, 97.3, 611
See application file for complete search history.

(56) References Cited

U.S. PATENT DOCUMENTS

| | | | |
|---|---|---|---|
| 2011/0085353 A1* | 4/2011 | Hsu et al. | 362/633 |
| 2012/0014137 A1* | 1/2012 | Yu | 362/632 |
| 2012/0087110 A1* | 4/2012 | Lee | 362/97.3 |
| 2012/0287367 A1* | 11/2012 | Zhang et al. | 349/58 |
| 2013/0128498 A1* | 5/2013 | Kuo et al. | 362/97.1 |
| 2013/0242608 A1* | 9/2013 | Chen et al. | 362/611 |
| 2013/0329400 A1* | 12/2013 | Kuo et al. | 362/97.2 |

* cited by examiner

*Primary Examiner* — Nimeshkumar Patel
*Assistant Examiner* — Kevin Quarterman
(74) *Attorney, Agent, or Firm* — Andrew C. Cheng

(57) ABSTRACT

The present invention provides a display device, back plate element for backlight module and manufacturing mold for splicing parts. The back plate element includes at least two splicing parts and the splicing parts are disposed on the same side of optical component of backlight module. Splicing part has splicing unit for connecting another splicing part. Through adjusting the number of splicing parts, the side length of back plate elements can be adjusted to side length of optical component. The back plate element can be disassembled to reduce the transport volume. A plurality of splicing parts can be manufactured with the same manufacturing mold. As such, the present invention can achieve mold sharing and reduce mold cost.

18 Claims, 2 Drawing Sheets

DISPLAY DEVICE, BACK PLATE ELEMENT AND SPLICING PARTS OF BACKLIGHT MODULE AND MANUFACTURING MOLD FOR SPLICING PARTS THEREOF

BACKGROUND OF THE INVENTION

1. Field of the Invention

The present invention relates to the field of liquid crystal displaying techniques, and in particular to a display device, back plate element and splicing parts of backlight module, and manufacturing mold for splicing parts thereof.

2. The Related Arts

Liquid crystal display device is common equipment. As widely known, the liquid crystal display device comprises backlight module and liquid crystal panel, wherein the backlight module usually comprises optical component and back plate elements.

In known manufacturing techniques, specific manufacturing mold is required for making related part; therefore, different shapes or sizes of parts need to use different molds. For example, 15-inche and 19-inch liquid crystal display devices will need different back plate elements, which require different manufacturing molds to manufacture. As the variety of the liquid crystal display devices increases, different molds must be prepared, which results in not only inconvenience to the manufacturing process but also an increase in manufacturing cost.

In addition, in the current manufacturing process, back plate element is usually monolithically manufactured. Thus, the costs of transport and storage are both increased.

SUMMARY OF THE INVENTION

The technical issue to be addressed by the present invention is to provide a display device, back plate element and splicing parts of backlight module, and manufacturing mold for splicing parts thereof. The back plate element can solve the high mold cost and high transport cost problems for known back plate elements.

The present invention provides a back plate element of backlight module. The backlight module comprises: optical component and at least two splicing parts, and the splicing parts being disposed on a same side of the optical component; the splicing parts having splicing unit for splicing with another splicing part, the splicing unit comprising: first engaging part and first positioning part disposed at one end, and second engaging part and second positioning part disposed on the other end; the first engaging part of the splicing part and the second engaging part of another splicing part being engaged, the first positioning part of the splicing part matching the second positioning part of another splicing part to prevent splicing part from disengaging from another splicing part; changing the length of back plate element through adjusting number of splicing parts so that the length of back plate element matching the length of the side of optical component.

According to a preferred embodiment of the present invention, the splicing part comprises side wall disposed correspondingly to side of optical component and fixing plate for pressing against optical component, side wall is connected to fixing plate, the first engaging part is a protruding block disposed on side wall, the first positioning part is a bump disposed on fixing plate, the second engaging part is an engaging hole disposed on side wall, the second positioning part is a positioning trench disposed on fixing plate, the protruding block penetrates the engaging hole and the bump is housed inside positioning trench.

According to a preferred embodiment of the present invention, a first positioning hole is disposed on splicing unit with interval from the protruding block, and a second positioning hole disposed with interval from the engaging hole; the first positioning hole of one splicing part and the second positioning hole of another splicing part are fixedly connected by screw or rivet.

According to a preferred embodiment of the present invention, the protruding block and the engaging hole are interface fit, the bump and the positioning trench are interface fit, the fixing plate is for supporting optical component or supporting liquid crystal panel.

According to a preferred embodiment of the present invention, the splicing part comprises side wall disposed correspondingly to side of optical component and fixing plate for pressing against optical component, side wall is connected to fixing plate, the first engaging part is an engaging hole disposed on side wall, the first positioning part is a bump disposed on fixing plate, the second engaging part is a protruding block disposed on side wall, the second positioning part is a positioning trench disposed on fixing plate, the protruding block penetrates the engaging hole and the bump is housed inside positioning trench.

According to a preferred embodiment of the present invention, a first positioning hole is disposed on splicing unit with interval from the protruding block, and a second positioning hole disposed with interval from the engaging hole; the first positioning hole of one splicing part and the second positioning hole of another splicing part are fixedly connected by screw or rivet.

According to a preferred embodiment of the present invention, the protruding block and the engaging hole are interface fit, the bump and the positioning trench are interface fit, the fixing plate is for supporting optical component or supporting liquid crystal panel.

According to a preferred embodiment of the present invention, number of back plate elements is plural, and the plurality of back plate elements are connected in head-to-tail manner, the back plate element further comprises support unit, the support unit is disposed between the plurality back plate elements for supporting optical component.

The present invention provides a manufacturing mold for splicing parts, the manufacturing mold being for manufacturing splicing parts, a plurality of splicing parts being for splicing together to form back plate element, back plate element being for backlight module, and the splicing parts being disposed on a same side of optical component of the backlight module; the splicing parts comprising splicing unit for splicing with another splicing part, changing the length of back plate element through adjusting number of splicing parts so that the length of back plate element matching the length of the side of optical component.

According to a preferred embodiment of the present invention, the splicing unit comprises: first engaging part and first positioning part disposed at one end, and second engaging part and second positioning part disposed on the other end; wherein the first engaging part of the splicing part and the second engaging part of another splicing part being engaged, the first positioning part of the splicing part matching the second positioning part of another splicing part to prevent splicing part from disengaging from another splicing part.

According to a preferred embodiment of the present invention, the splicing part comprises side wall disposed correspondingly to side of optical component and fixing plate for pressing against optical component, side wall is connected to fixing plate, the first engaging part is a protruding block disposed on side wall, the first positioning part is a bump disposed on fixing plate, the second engaging part is an engaging hole disposed on side wall, the second positioning part is a positioning trench disposed on fixing plate, the protruding block penetrates the engaging hole and the bump is housed inside positioning trench.

According to a preferred embodiment of the present invention, the splicing part comprises side wall disposed correspondingly to side of optical component and fixing plate for pressing against optical component, side wall is connected to fixing plate, the first engaging part is an engaging hole disposed on side wall, the first positioning part is a bump disposed on fixing plate, the second engaging part is a protruding block disposed on side wall, the second positioning part is a positioning trench disposed on fixing plate, the protruding block penetrates the engaging hole and the bump is housed inside positioning trench.

The present invention provides a display device, which comprises: backlight module and back plate element for backlight module, The backlight module comprises: optical component and at least two splicing parts, and the splicing parts being disposed on a same side of the optical component; the splicing parts having splicing unit for splicing with another splicing part, the splicing unit comprising: first engaging part and first positioning part disposed at one end, and second engaging part and second positioning part disposed on the other end; the first engaging part of the splicing part and the second engaging part of another splicing part being engaged, the first positioning part of the splicing part matching the second positioning part of another splicing part to prevent splicing part from disengaging from another splicing part; changing the length of back plate element through adjusting number of splicing parts so that the length of back plate element matching the length of the side of optical component.

According to a preferred embodiment of the present invention, the splicing part comprises side wall disposed correspondingly to side of optical component and fixing plate for pressing against optical component, side wall is connected to fixing plate, the first engaging part is a protruding block disposed on side wall, the first positioning part is a bump disposed on fixing plate, the second engaging part is an engaging hole disposed on side wall, the second positioning part is a positioning trench disposed on fixing plate, the protruding block penetrates the engaging hole and the bump is housed inside positioning trench.

According to a preferred embodiment of the present invention, a first positioning hole is disposed on splicing unit with interval from the protruding block, and a second positioning hole disposed with interval from the engaging hole; the first positioning hole of one splicing part and the second positioning hole of another splicing part are fixedly connected by screw or rivet.

According to a preferred embodiment of the present invention, the protruding block and the engaging hole are interface fit, the bump and the positioning trench are interface fit, the fixing plate is for supporting optical component or supporting liquid crystal panel.

According to a preferred embodiment of the present invention, the splicing part comprises side wall disposed correspondingly to side of optical component and fixing plate for pressing against optical component, side wall is connected to fixing plate, the first engaging part is an engaging hole disposed on side wall, the first positioning part is a bump disposed on fixing plate, the second engaging part is a protruding block disposed on side wall, the second positioning part is a positioning trench disposed on fixing plate, the protruding block penetrates the engaging hole and the bump is housed inside positioning trench.

According to a preferred embodiment of the present invention, a first positioning hole is disposed on splicing unit with interval from the protruding block, and a second positioning hole disposed with interval from the engaging hole; the first positioning hole of one splicing part and the second positioning hole of another splicing part are fixedly connected by screw or rivet.

According to a preferred embodiment of the present invention, the protruding block and the engaging hole are interface fit, the bump and the positioning trench are interface fit, the fixing plate is for supporting optical component or supporting liquid crystal panel.

The efficacy of the present invention is that to be distinguished from the state of the art. The present invention provides a display device, back plate element for backlight module and manufacturing mold for splicing parts. According to the present invention, the back plate element comprises at least two splicing parts. Through detachable splicing parts, the back plate element can be disassembled to reduce the size and volume for reducing transport cost. In addition, through adjusting the number of splicing parts, different specific shape of back plate elements can be formed, and a plurality of splicing parts can be manufactured with the same manufacturing mold. As such, the present invention can achieve mold sharing and reduce mold cost.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

The following describes the present invention in details with drawings and embodiments. It should be understood that the drawings described below show only example embodiments of the present invention and for those having ordinary skills in the art, other drawings may be easily obtained from these drawings without paying any creative effort.

Figure 1:
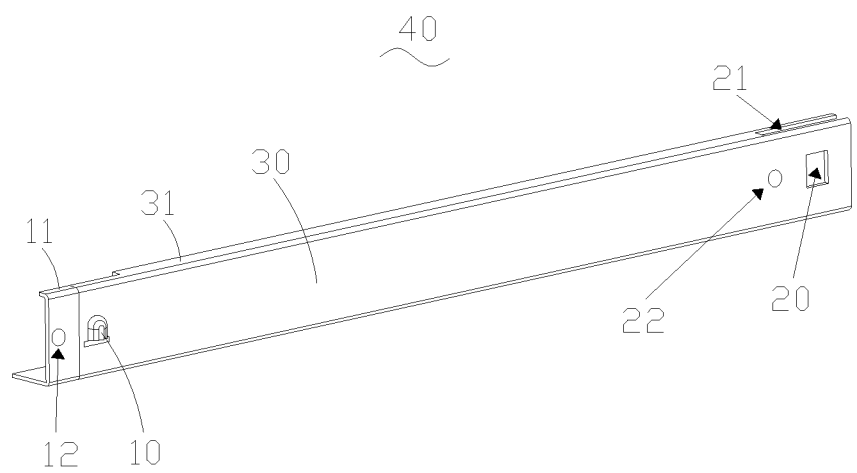
FIG. 1 is a schematic view showing the structure of splicing parts of back plate element of an embodiment according to the present invention.
Figure 2:
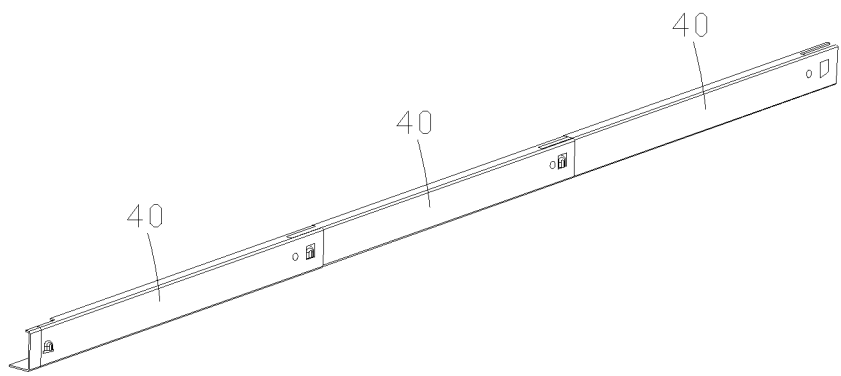
FIG. 2 is a schematic view of connection manner of splicing parts of FIG. 1.
Figure 3:
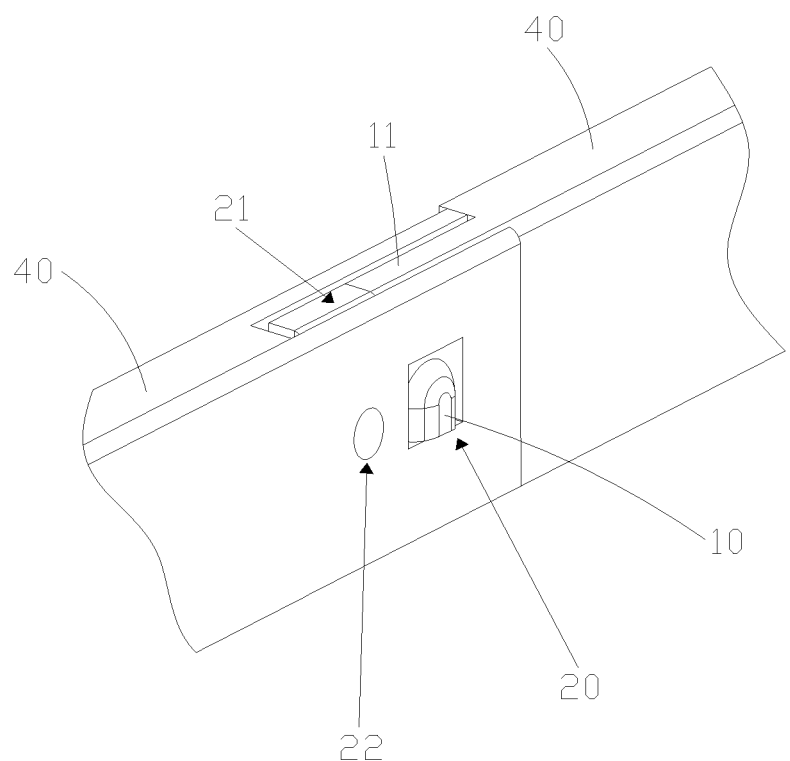
FIG. 3 is a schematic view of connection manner of any two splicing parts of FIG. 2.

Refer to FIG. 1 and FIG. 3. In the first embodiment of the present invention, a back plate element comprises at least two splicing parts 40 and both splicing parts 40 are disposed on a same side of an optical component. Because all splicing parts have the same structure, the following describes one splicing part for explanation.

A splicing part 40 is for connecting a splicing unit of another splicing part 40. In the instant embodiment, the length of back plate element can be adjusted through changing the number of splicing parts 40 so that the length of back plate element 40 can match the length of the side of optical component. For example, when the side length of the optical component is 20 cm and the length of splicing part 40 is 5 cm, four splicing parts 40 can be assembled into a back plate element to match the corresponding side of the optical component.

The following describes the structure of splicing part 40 and connection manner of two splicing parts 40 specifically.

Splicing part 40 comprises side wall 30 disposed correspondingly to side of optical component and fixing plate 31 for pressing against optical component. Side wall 30 is connected to fixing plate 31. It is worth noting that in the present embodiment, fixing plate 31 is the stopping wall for supporting liquid crystal panel. In other embodiment, fixing plate 31 can also be bottom plate supporting optical component. In other words, fixing plate 31 can be for supporting optical component for liquid crystal panel, and the present invention does not impose specific restriction. The following uses fixing plate 31 as a stopping wall for supporting liquid crystal panel as example for explanation. Specifically, when fixing plate 31 is used as bottom plate for supporting optical component, the basic structure remains the same, except the orientation is upside down.

Splicing part 40 further comprises first engaging part and first positioning part disposed at one end of splicing part 40, and second engaging part and second positioning part disposed on the other end of splicing part 40. The first engaging part of the splicing part 40 and the second engaging part of another splicing part 40 are engaged, and the first positioning part of the splicing part 40 matches the second positioning part of another splicing part 40 to prevent splicing part 40 from disengaging from another splicing part 40. Or, the second engaging part of splicing part 40 and the first engaging part of another splicing part 40 are engaged, and the second position part of the splicing part 40 matches the first positioning part of another splicing part 40 to prevent splicing part 40 from disengaging from another splicing part 40.

Specifically, the first engaging part is a protruding block 10 disposed on side wall 30, the first positioning part is a bump 11 disposed on fixing plate 31, the second engaging part is an engaging hole 20 disposed on side wall 30, and the second positioning part is a positioning trench 21 disposed on fixing plate 31. The connection manner includes: protruding block 10 penetrating the engaging hole 20 and the bump 11 being housed inside positioning trench 21. Obviously, the above connection manner is the connection manner between two splicing parts 40, instead of protruding block 10 and engaging hole 20, or bump 11 and positioning trench 21 of the same splicing part 40.

In the instant embodiment, protruding block 10 and engaging hole 20 can be connected in a manner of interface fit, and bump 11 and positioning trench 21 can also be connected in a manner of interface fit. In another embodiment, protruding block 10 and engaging hole 20, and bump 11 and positioning trench 21 can be engaged using other means, such as, screw or rivet to fixing engaged. No specific restriction is imposed by the present invention.

It is be noted that the first engaging part, the first positioning part, the second engaging part and the second positioning part can all be disposed in a flexible manner so as to match and fix two splicing parts 40. For example, in another embodiment, the first engaging part can be engaging hole 20 disposed on side wall 30, the first positioning part is a bump 11 disposed on fixing plate 31, the second engaging part is protruding block 10 disposed on side wall 30, and the second positioning part is a positioning trench 21 disposed on fixing plate 31. The specific connection manner also includes: protruding block 10 penetrating the engaging hole 20 and the bump 11 being housed inside positioning trench 21. It should be understood that the key is to connect two splicing parts 40 through the matching of the first engaging part, the first positioning part, the second engaging part and the second positioning part. The features of specific location and order can all be altered flexibly, and the present invention does not impose specific restriction.

As aforementioned, fixing plate 31 can also be used bottom plate for supporting optical component. It should be understood that when fixing plate 31 is bottom plate for supporting optical component, bump 11 is disposed on one end of the bottom plate, and positioning trench is disposed at the other end of the bottom plate. The features of structure and function remain the same.

For better connection result, splicing part 40 can further comprise a first positioning hole 12 and a second positioning hole 22. In the instant embodiment, first positioning hole 12 is disposed on one end of splicing part 40, and is with interval from the protruding block 10. Second positioning hole 22 is disposed at the other end of splicing part 40, and is with interval from the engaging hole 20. First positioning hole 12 of one splicing part 40 and second positioning hole 22 of another splicing part 40 are fixedly connected by screw or rivet. In other words, when two splicing parts 40 are connected, first positioning hole 12 and second positioning hole 22 are aligned for the screw or the rivet to penetrate.

It should be noted that the specific features of first positioning hole 12 and second positioning hole 22, such as, shape and size, can be altered flexibly to accommodate actual application and no specific restriction is imposed by the present invention. In addition, it is obvious that other means can also be used for connection other than screw or rivet, such as, positioning column. For example, first positioning hole 12 and second positioning hole 22 are both square or triangular so that a corresponding positioning column (or interface fit) can be used for positioning.

Furthermore, in another embodiment, first positioning hole 12 (or second positioning hole 22) can be disposed as a positioning column monolithically formed with splicing part 40 so as to engage second positioning hole 22 (or first positioning hole 12) of another splicing part 40 to further fix two splicing parts 40. Hence, for those having ordinary skills in the art, other features easily obtained without paying any creative effort are also within the scope of the present invention.

Figure 4:
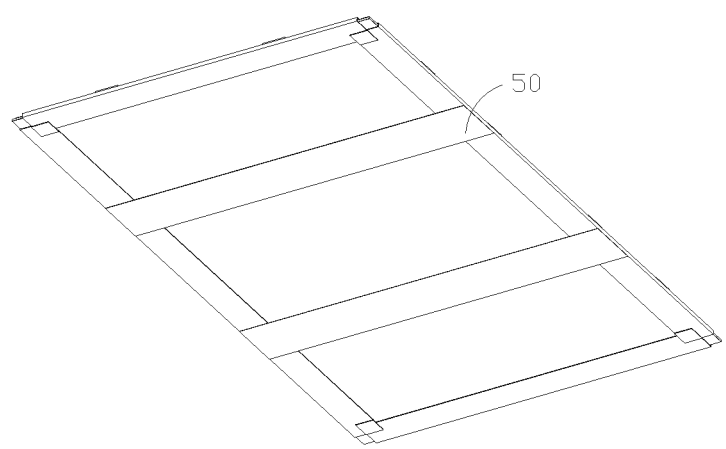
FIG. 4 is a schematic view of assembly manner of a plurality of back plate elements of embodiment according to the present invention.

Refer to FIG. 4. In the instant embodiment, the number of back plate elements is plural. A plurality of back plate elements is connected in a head-to-tail manner to form a complete back plate element, wherein the back plate element further comprises support unit 50, and the support unit 50 is disposed on a plurality of back plate elements for supporting optical component.

It is noted that support unit 50 is not the necessary feature of the present invention. Hence, support unit 50 can be of any structure or number, and remains within the scope of the present invention. For example, support unit 50 can be long strips disposed with intervals or in other manner, such as monolithically formed bottom plate, support columns disposed with intervals. The layout can be flexibly altered, such as, in the shape of a cross or a tic-tac-toe. In short, for those having ordinary skills in the art, other features easily obtained without paying any creative effort are also within the scope of the present invention.

In the first embodiment of the present invention, the back plate element comprises at least two splicing parts. Through the detachable assembly, the back plate element can be disassembled to reduce the size for transport for reducing transport cost. In addition, through adjusting the number of splicing parts, different specific shape of back plate elements can be formed, and a plurality of splicing parts 40 can be manufactured with the same manufacturing mold. As such, the present invention can achieve mold sharing and reduce mold cost.

The second embodiment of the present invention provides manufacturing mold for splicing parts for manufacturing splicing parts of the previous embodiment to assemble the back plate element of the previous embodiment. The details will not be repeated here.

By the manufacturing mold of the second embodiment of the present invention, a plurality of splicing parts can be manufactured. Through adjusting the number of splicing parts, the length of back plate elements can be changed. Through mold sharing, the manufacturing mold of the second embodiment of the present invention can effectively reduce the mold cost.

The third embodiment of the present invention provides a backlight module. The backlight module comprises the back plate element of the first embodiment. The specific structure of the back plate element will not be repeated here.

The fourth embodiment of the present invention provides a display device. The display device comprises the back plate element of the first embodiment. The specific structure of the back plate element will not be repeated here.

In the third and the fourth embodiments of the present invention, he back plate element of the first embodiment is included to reduce the transport size and transport cost. Also, through mold sharing, the manufacturing mold of the second embodiment of the present invention can effectively reduce the mold cost. It is understood that the overall costs of backlight module and the display device will also be reduced.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A back plate element of a backlight module, the back plate element comprises at least two splicing parts, and each splicing part comprises:
    a splicing unit for splicing with another splicing part, the splicing unit comprising:
        a first engaging part and a first positioning part disposed at one end of the splicing part, and
        a second engaging part and a second positioning part disposed on the other end of the splicing part;
    wherein the first engaging part of one splicing part and the second engaging part of another splicing part are engaged, the first positioning part of the one splicing part matches the second positioning part of another splicing part to prevent the one splicing part from disengaging from another splicing part; changing the length of the back plate element through adjusting the number of the splicing parts;
    wherein each splicing part further comprises a side wall and a fixing plate laterally extending from the side wall, the first engaging part is disposed on the side wall, the first positioning part is disposed on the fixing plate, the second engaging part is disposed on the side wall, the second positioning part is disposed on the fixing plate.

2. The back plate element as claimed in claim 1, characterized in that the first engaging part is a protruding block disposed on the side wall, the first positioning part is a bump disposed on the fixing plate, the second engaging part is an engaging hole disposed on the side wall, the second positioning part is a positioning trench disposed on the fixing plate, the protruding block penetrates the engaging hole and the bump is housed inside the positioning trench.

3. The back plate element as claimed in claim 2, characterized in that the splicing unit further comprises:
    a first positioning hole is disposed with interval from the protruding block, and
    a second positioning hole disposed with interval from the engaging hole;
    wherein the first positioning hole of one splicing part and the second positioning hole of another splicing part are fixedly connected by screw or rivet.

4. The back plate element as claimed in claim 2, characterized in that the protruding block and the engaging hole are interface fit, the bump and the positioning trench are interface fit.

5. The back plate element as claimed in claim 2, characterized in that the first engaging part is an engaging hole disposed on the side wall, the first positioning part is a bump disposed on the fixing plate, the second engaging part is a protruding block disposed on the side wall, the second positioning part is a positioning trench disposed on the fixing plate, the protruding block penetrates the engaging hole and the bump is housed inside the positioning trench.

6. The back plate element as claimed in claim 5, characterized in that the splicing unit further comprises:
    a first positioning hole is disposed with interval from the protruding block, and
    a second positioning hole disposed with interval from the engaging hole;
    wherein the first positioning hole of one splicing part and the second positioning hole of another splicing part are fixedly connected by screw or rivet.

7. The back plate element as claimed in claim 5, characterized in that the protruding block and the engaging hole are interface fit, the bump and the positioning trench are interface fit.

8. The back plate element as claimed in claim 1, characterized in that the number of back plate elements is plural, and the plurality of back plate elements are connected in head-to-tail manner, the back plate element further comprises:
    a support unit, being disposed between the plurality back plate elements.

9. A manufacturing mold for splicing parts, characterized in that the manufacturing mold being for manufacturing a plurality of splicing parts, the plurality of splicing parts being for splicing together to form a back plate element for a backlight module; each of the plurality of splicing parts comprises:
    a splicing unit for splicing with another splicing part, the splicing unit comprises:
        a first engaging part and a first positioning part disposed at one end of the splicing part, and
        a second engaging part and a second positioning part disposed on the other end of the splicing part;
    wherein the first engaging part of one splicing part and the second engaging part of another splicing part are engaged, the first positioning part of the one splicing part matches the second positioning part of another splicing part to prevent the one splicing part from disengaging from another splicing part;

wherein changing a length of the back plate element through adjusting the number of the plurality of splicing parts;

wherein each splicing part further comprises a side wall and a fixing plate laterally extending from the side wall, the first engaging part is disposed on the side wall, the first positioning part is disposed on the fixing plate, the second engaging part is disposed on the side wall, the second positioning part is disposed on the fixing plate.

10. The manufacturing mold as claimed in claim 9, characterized in that the first engaging part is a protruding block disposed on the side wall, the first positioning part is a bump disposed on the fixing plate, the second engaging part is an engaging hole disposed on the side wall, the second positioning part is a positioning trench disposed on the fixing plate, the protruding block penetrates the engaging hole and the bump is housed inside the positioning trench.

11. The manufacturing mold as claimed in claim 9, characterized in that the first engaging part is an engaging hole disposed on the side wall, the first positioning part is a bump disposed on the fixing plate, the second engaging part is a protruding block disposed on the side wall, the second positioning part is a positioning trench disposed on the fixing plate, the protruding block penetrates the engaging hole and the bump is housed inside the positioning trench.

12. A display device, characterized in that the display device comprises a backlight module, the backlight module comprises a back plate element comprising at least two splicing parts; each splicing partcomprises:
 a splicing unit for splicing with another splicing part, the splicing unit comprising:
  a first engaging part and a first positioning part disposed at one end of the splicing part, and
  a second engaging part and a second positioning part disposed on the other end of the splicing part;
 wherein the first engaging part of one splicing part and the second engaging part of another splicing part are engaged, the first positioning part of the one splicing part matches the second positioning part of another splicing part to prevent the one splicing part from disengaging from another splicing part; changing the length of the back plate element through adjusting the number of the splicing parts;
 wherein each splicing part further comprises a side wall and a fixing plate laterally extending from the side wall, the first engaging part is disposed on the side wall, the first positioning part is disposed on the fixing plate, the second engaging part is disposed on the side wall, the second positioning part is disposed on the fixing plate.

13. The display device as claimed in claim 12, characterized in that the first engaging part is a protruding block disposed on the side wall, the first positioning part is a bump disposed on the fixing plate, the second engaging part is an engaging hole disposed on the side wall, the second positioning part is a positioning trench disposed on the fixing plate, the protruding block penetrates the engaging hole and the bump is housed inside the positioning trench.

14. The display device as claimed in claim 13, characterized in that the splicing unit further comprises:
 a first positioning hole is disposed with interval from the protruding block, and
 a second positioning hole disposed with interval from the engaging hole;
 wherein the first positioning hole of one splicing part and the second positioning hole of another splicing part are fixedly connected by screw or rivet.

15. The display device as claimed in claim 13, characterized in that the protruding block and the engaging hole are interface fit, the bump and the positioning trench are interface fit.

16. The display device as claimed in claim 12, characterized in that the first engaging part is an engaging hole disposed on the side wall, the first positioning part is a bump disposed on the fixing plate, the second engaging part is a protruding block disposed on the side wall, the second positioning part is a positioning trench disposed on the fixing plate, the protruding block penetrates the engaging hole and the bump is housed inside the positioning trench.

17. The display device as claimed in claim 16, characterized in that the splicing unit further comprises:
 a first positioning hole is disposed with interval from the protruding block, and
 a second positioning hole disposed with interval from the engaging hole;
 wherein the first positioning hole of one splicing part and the second positioning hole of another splicing part are fixedly connected by screw or rivet.

18. The display device as claimed in claim 16, characterized in that the protruding block and the engaging hole are interface fit, the bump and the positioning trench are interface fit.

* * * * *